> US005918635A

United States Patent [19]
Wang et al.

[11] Patent Number: 5,918,635
[45] Date of Patent: Jul. 6, 1999

[54] LOW PRESSURE SOLENOID VALVE

[75] Inventors: Jia Wang, N. Aurora; John N. Tackes, Lake Zurich; Dan Alexander, Schaumburg, all of Ill.

[73] Assignee: Vickers, Incorporated, Maumee, Ohio

[21] Appl. No.: 08/947,405

[22] Filed: Oct. 8, 1997

[51] Int. Cl.$^6$ .................................................. F15B 13/044
[52] U.S. Cl. ............................ 137/625.65; 251/129.07; 251/129.15
[58] Field of Search ................. 137/625.16; 251/129.07, 251/129.15; 335/261

[56] References Cited

U.S. PATENT DOCUMENTS

| | | | |
|---|---|---|---|
| Re. 32,783 | 11/1988 | Clark | 335/261 |
| Re. 32,860 | 2/1989 | Clark | 335/261 |
| 3,633,139 | 1/1972 | Thompson | 335/255 |
| 3,880,476 | 4/1975 | Belart et al. | |
| 4,211,254 | 7/1980 | Dyal | 137/596.12 |
| 4,223,693 | 9/1980 | Kosarzecki | 137/106 |
| 4,300,584 | 11/1981 | Kosarzecki | 137/106 |
| 4,316,599 | 2/1982 | Bouvet et al. | |
| 4,524,947 | 6/1985 | Barnes et al. | 251/129.15 X |
| 4,531,536 | 7/1985 | Kosarzecki | 137/111 |
| 4,540,154 | 9/1985 | Kolchinsky et al. | 251/129.15 |
| 4,548,383 | 10/1985 | Wolfges | |
| 4,653,527 | 3/1987 | Kosarzecki | 137/244 |
| 4,662,605 | 5/1987 | Garcia | 251/129.08 |
| 4,744,389 | 5/1988 | Ichihashi | 137/625.65 |
| 4,836,248 | 6/1989 | Stegmaier | 251/129.15 X |
| 5,002,253 | 3/1991 | Kolchinsky et al. | 251/129.15 |
| 5,014,747 | 5/1991 | Suzuki et al. | |
| 5,123,718 | 6/1992 | Tyler | 303/118 |
| 5,156,184 | 10/1992 | Kolchinsky | 137/625.65 X |
| 5,174,338 | 12/1992 | Yokota et al. | |
| 5,234,265 | 8/1993 | Tyler | 303/118.1 |
| 5,299,600 | 4/1994 | Aronovich | 137/625.65 |
| 5,306,076 | 4/1994 | Tyler | 303/118.1 |
| 5,318,354 | 6/1994 | Tyler | 303/3 |
| 5,326,070 | 7/1994 | Baron | 251/129.15 |
| 5,328,151 | 7/1994 | Hashida | 251/129.15 |
| 5,377,720 | 1/1995 | Stobbs et al. | 137/625.65 |
| 5,479,901 | 1/1996 | Gibson et al. | 137/625.65 X |
| 5,497,975 | 3/1996 | Achmad | 251/129.07 |
| 5,518,030 | 5/1996 | Liu et al. | 137/625.65 |
| 5,529,387 | 6/1996 | Mialkowski | 251/30.03 |
| 5,538,220 | 7/1996 | LaMarca | 251/129.15 |
| 5,564,676 | 10/1996 | Goloff et al. | 251/129.15 |
| 5,586,747 | 12/1996 | Bennardo et al. | 251/129.18 |
| 5,588,414 | 12/1996 | Hrytzak et al. | 123/571 |
| 5,598,871 | 2/1997 | Sturman et al. | 251/129.07 X |
| 5,639,066 | 6/1997 | Lambert et al. | 251/129.07 X |
| 5,640,987 | 6/1997 | Sturman | 137/625.65 X |

FOREIGN PATENT DOCUMENTS

| | | |
|---|---|---|
| 42 21 757 A1 | 1/1994 | Germany . |
| 196 37 174 A1 | 3/1997 | Germany . |
| WO 91/05195 | 4/1991 | WIPO . |

OTHER PUBLICATIONS

PCT Search Report for PCT/US98/16092.

*Primary Examiner*—Gerald A. Michalsky
*Attorney, Agent, or Firm*—Emch, Schaffer, Schaub & Porcello Co., L.P.A.

[57] ABSTRACT

A solenoid valve utilizes a single unitary member as a combined core/spool which is axially moveable between an extended deactivated position to a retracted activated position upon actuation of its coil. The valve includes a coil in which the windings on a bobbin are encapsulated by injection molding an outer member therearound. The valve also includes a washer which becomes adhered to the outer member during injection molding, a plug member supported on the washer and a sleeve encircling the coil. The plug member has an end positioned to be contacted by the core/spool upon actuation which is contoured to provide minimal contact surface between it and the core/spool.

28 Claims, 4 Drawing Sheets

LOW PRESSURE SOLENOID VALVE

The present invention is directed to a low pressure solenoid valve having an integral coil with an integral connector and a one-piece, unitary core and spool.

1. Background Art

Solenoid valves have been used for a wide variety of purposes. U.S. Pat. No. 5,497,975 discloses a two-way solenoid pneumatic valve which is pressure balanced and which, according to one embodiment, utilizes a spool and core constructed of a unitary member.

2. Disclosure of the Invention

The low pressure solenoid valve of the present invention is a three-way low pressure solenoid valve having a one-piece, unitary core and spool and an integral coil with an integral connector member. As a result of such integrated construction, the solenoid valve of the present invention may be assembled with a process which is greatly simplified as compared with the assembly process required for conventional solenoid valves. Additionally, the feature of the core and spool being a one-piece, unitary member contributes to the simplification of assembly while permitting the valve to have a small number of parts. The valve can be readily assembled into a fluid flow system without disassembling the coil itself.

IN THE DRAWINGS

BEST MODE OF CARRYING OUT THE INVENTION

Figure 1:
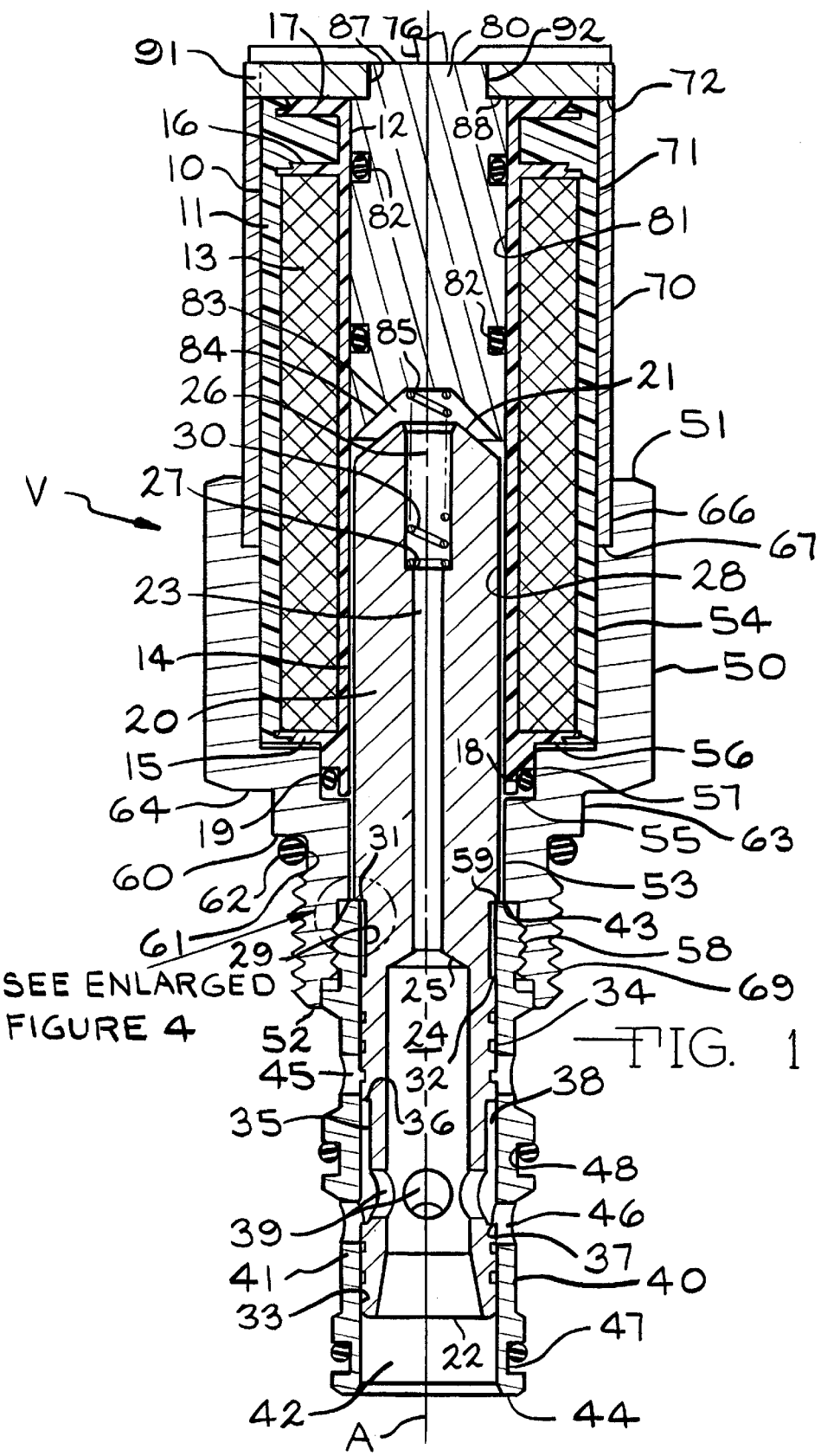
FIG. 1 is a sectional elevational view, of the valve of the present invention in the de-energized position.
Figure 2:
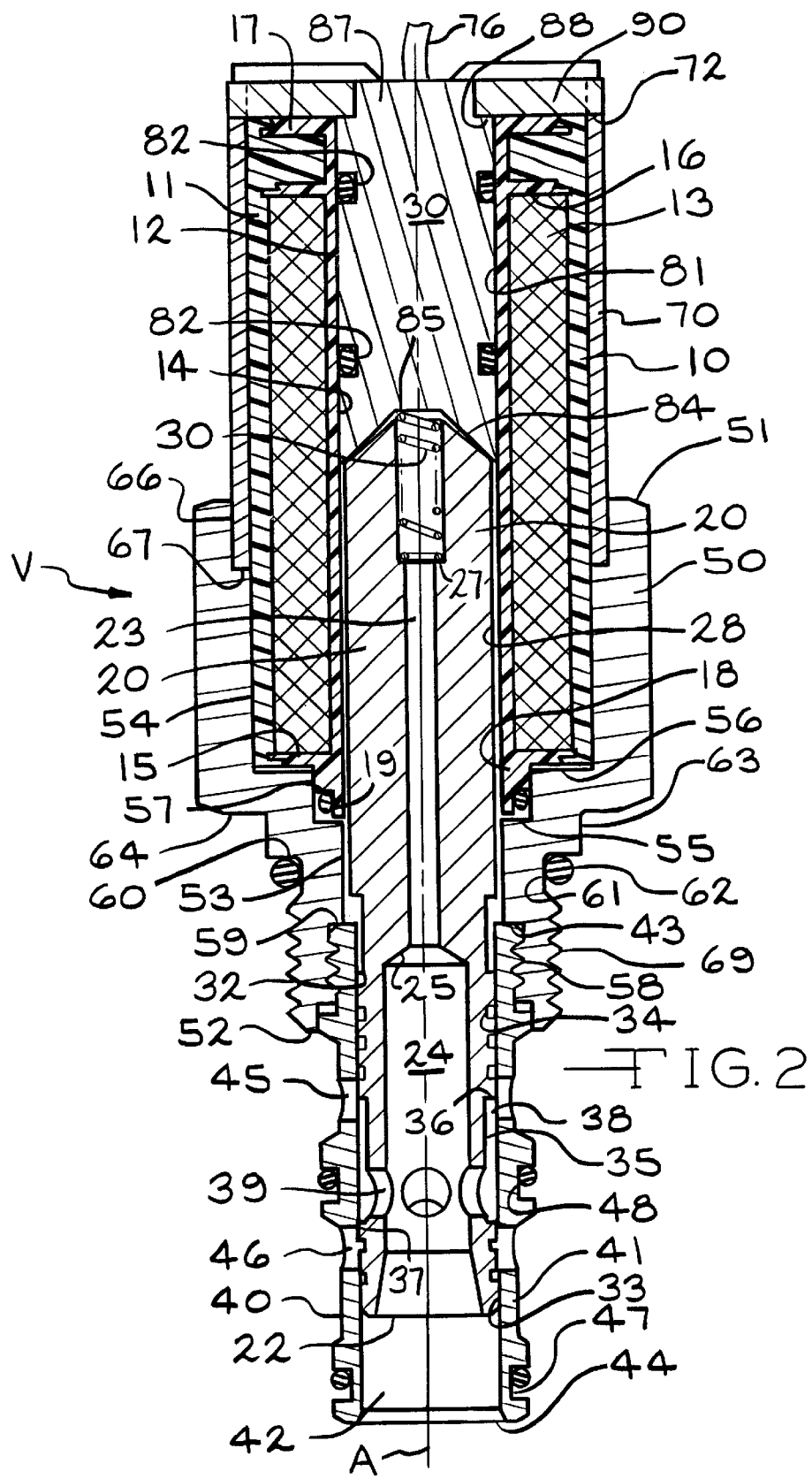
FIG. 2 is a view similar to FIG. 1 showing the valve in the energized position.

Referring to FIGS. 1 and 2, there is shown a low pressure solenoid valve V having a retainer 50 extending along an axis A from a first end 51 to a second end 52. The retainer 50 has a first inwardly facing cylindrical wall surface 53 and a second, larger inwardly facing cylindrical wall surface 54 both of which extend parallel to axis A. Adjacent the first end 51 is a still larger third inwardly facing wall surface 66 extending from the first end 51 to a ledge 67 which extends radially to the second inwardly facing wall surface 54.

The retainer 50 has a step between the first inwardly facing cylindrical wall surface 53 and second inwardly facing cylindrical wall surface 54 which includes a first radial shoulder 55 extending outwardly from the first inwardly facing cylindrical wall surface 53 and a second radial shoulder 56 extending inwardly from the second inwardly facing cylindrical wall surface 54 and joined together by an axially extending step 57.

External threads 69 are provided adjacent the second end 52 to provide connection means to a fluid flow system. Inwardly facing threads 58 are also provided adjacent the second end 52. A third radial shoulder 59 adjacent the threads 58 extends outwardly from the first inwardly facing wall surface 53.

Spaced from the external threads 69 is a first external radial shoulder 60 defining one side of an annular groove 61 in which is positioned an O-ring 62. Extending axially from the external radial shoulder 60 is an external step 63 from which extends a second external radial shoulder 64. In the area between the first end 51 and the second external radial shoulder 64 are a series of wrench flats 77 defining a hexagon in cross-section. (See FIG. 3).

Figure 4:
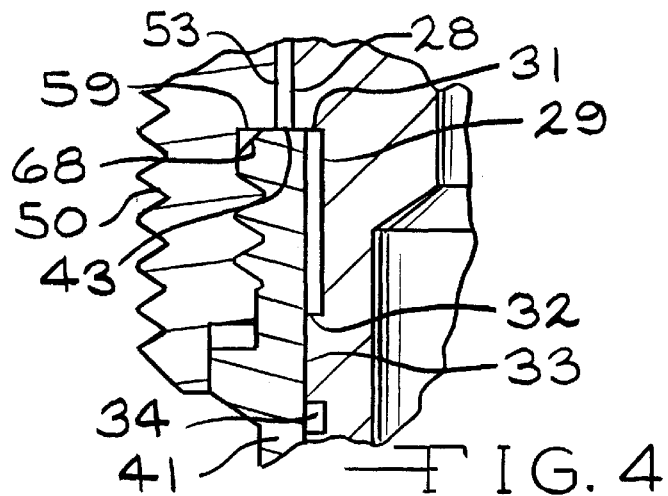
FIG. 4 is an enlarged fragmentary view of the encircled portion of FIG. 1 showing an abutment for limiting movement of the core/spool toward the free end of the cage.

Threadedly engaged to the inwardly facing threads 58 of the retainer 50 is a cage 40 having an annular wall 41 defining a passageway 42 extending along axis A. The annular wall 41 extends from a first end 43 sized to engage the third radial shoulder 59 of the retainer 50 to a second end 44 intended for engagement within the fluid flow system (not shown), The first end 43, in addition to having an outer radial extent which contacts the radial shoulder 59, extends radially inwardly to a position inwardly from the first inwardly facing cylindrical wall surface 53 of the retainer 50. A chamfer 68 extends between the first end 43 and the outer surface of the wall 41. (See FIG. 4).

The cage 40 is provided with a first set of ports 45, preferably eight in number, extending through the wall 41 and a second set of ports 46, preferably eight in number, extending through the wall 41 and positioned axially between the first set of ports 45 and the second end 44. Exteriorly the cage 40 is provided with a first enlarged area adjacent the second end in which is formed an annular groove 47 in which is positioned an O-ring and a second enlarged area in which is formed a second annular groove 48 in which is positioned another O-ring.

Positioned in the first end 51 of the retainer 50 is a sleeve 70 extending from a first end abutting the ledge 67 to a free end 72 outwardly from the first end 51 of retainer 50. The portion of the sleeve 70 adjacent the first end 51 is secured to the retainer 50 at the third inwardly facing wall surface 66, for example, by brazing. The sleeve 70 has an inwardly facing wall surface 71 substantially the same size as the second inwardly facing cylindrical wall surface 54 of the retainer 50.

Figure 3:
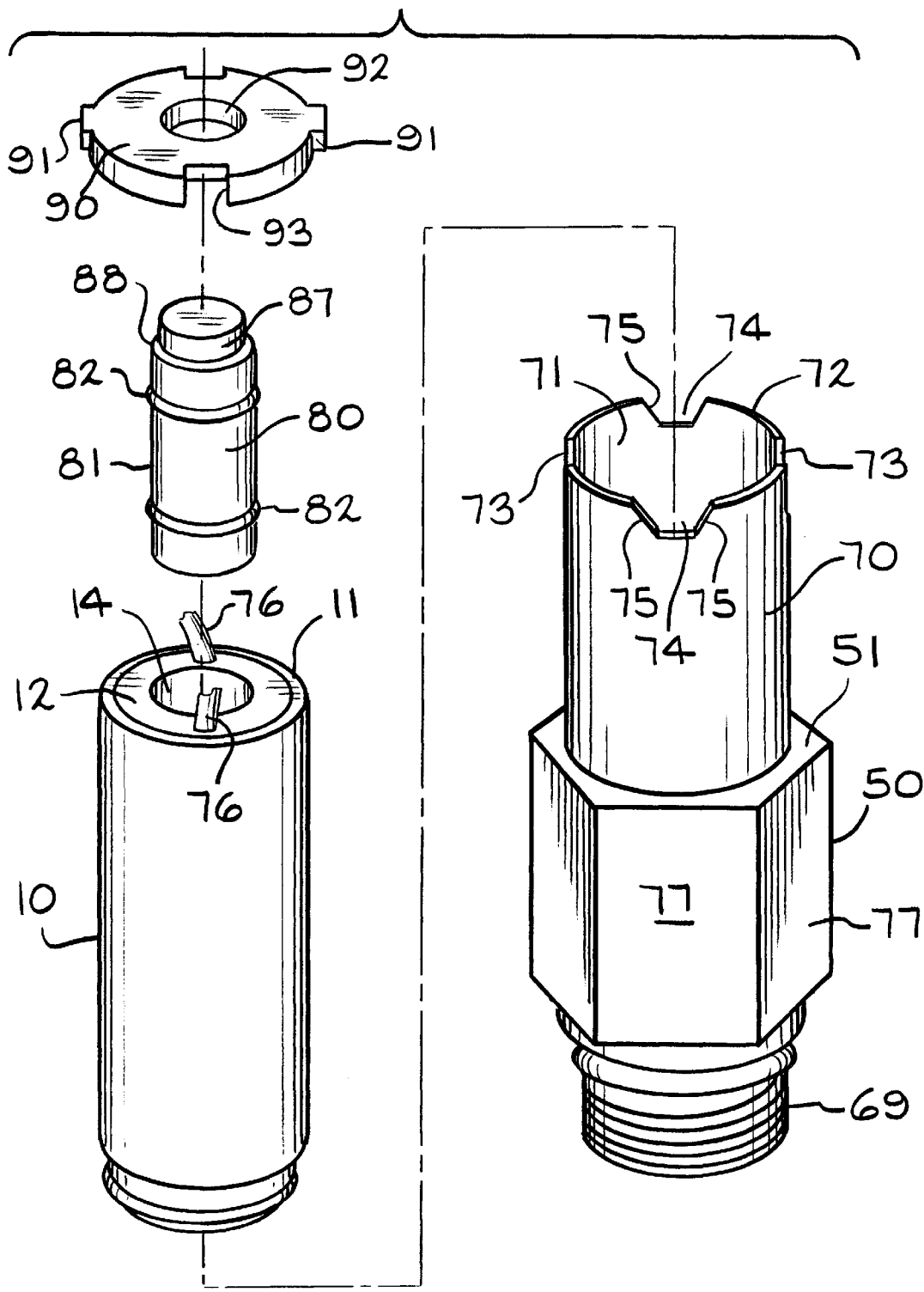
FIG. 3 is an exploded perspective of a portion of the valve shown in FIG. 1.

As may be seen in FIG. 3, the sleeve 70 has a pair of recesses 73 extending axially inwardly from the free end 72 and disposed 180° from one another for receiving tabs of a washer to be hereinafter described.

Also extending axially inwardly from the free end 72 of the sleeve 70 are a pair of slots 74 which are disposed 180° from one another and 90° from the recesses 73. Each of the slots include tapered segments 75 extending toward one another from the free end 72.

Positioned in the sleeve 70 and retainer 50 is a solenoid coil 10 having its outer surface engaged to the inwardly facing cylindrical wall surface 71 of the sleeve and the second inwardly facing wall surface 54 of the retainer 50. The coil 10 includes a bobbin 12 with windings 13 encapsulated therein by an outer plastic housing member 11 molded in place around the windings 13. The outer housing member 11 and the bobbin 12 are both molded of plastic. Preferably the plastic is black polyethylene terephthalate (PET) 15% glass filled thermoplastic resin sold as DuPont Rynite 415HP for the encapsulation outer housing member 11 and Rynite 530 for the bobbin 12. The bobbin 12 has an inwardly facing cylindrical wall surface 14, a lower radially outwardly extending wall 15 and a pair of upper radially outwardly extending walls 16 and 17, with the wall 17 defining the axially outermost portion of the coil 10. The outer surface of the outer housing member 11 is sized to permit insertion of the assembled coil 10 into the sleeve 70 and retainer 50 in engagement with the inwardly facing cylindrical wall 71 and second inwardly facing cylindrical wall surface 54 of the retainer 50.

Extending downwardly (as viewed in FIG. 1) from the lower outwardly extending radial wall 15 is a leg 18 which is received in the area of the retainer between the axial step 57 and the first radial shoulder 55. The leg 18 is recessed to provide a space between it and the axial step 57 in which an O-ring 19 is received. Lead wires 76 for energizing the coil 10 are connected to the windings 13 and extend outwardly through the bobbin 12 upper radially outwardly extending walls 16 and 17 and are in place when the outer housing member 11 is injection molded.

Preferably, a gap is provided between the lower wall 15 of the bobbin 12 and the second radial shoulder 56.

Positioned at the upper end of the coil 10 is a metal washer 90 having a central aperture 92 and a pair of outwardly extending ears 91 which are sized to fit in the recesses 73 of the sleeve. The thickness of the washer 90 is less than the depth of the recesses 73 so that those portions of the sleeve 70 between the recesses 73 will extend axially beyond the washer 90 and may be crimped over the washer 90 to hold it and other members assembled therewith in position. The slots 74 and tapered segments 75 provide areas of relief to accommodate such crimping. The washer 90 is also provided with a pair of recesses 93 positioned 90° from the ears 91 through which the lead wires 76 may extend.

At such time as the outer plastic housing member 11 is injection molded to the bobbin 12 to encapsulate the windings 13, the washer 90 is positioned to form the upper surface of the mold cavity into which the PET resin is injected. The washer 90 is thereby adhered to the outer plastic housing member 11.

Extending into the upper open end of the coil 10 is a plug 80 which extends approximately ½ the axial length of the coil. The plug 80 has a cylindrical side wall section 81 sized to fit within the inwardly facing cylindrical wall surface 14 of the bobbin 12 and has a pair of annular grooves each of which has positioned therein an O-ring 82 sealingly engaged to the inwardly facing cylindrical wall surface 14. The lower end of the plug 80 has a cavity 83 defined by a conical wall surface 84 and a central planar wall surface 85 disposed at a right angle to the axis. The upper end of the plug 80 has a reduced size cylindrical portion 87 extending axially upwardly from a shoulder 88. The reduced size cylindrical portion 87 is press fit in the central aperture 92 with the shoulder 88 engaging the lower surface of the washer 90.

Also positioned in the passageway defined by the inwardly facing cylindrical wall surface 14 is a combined unitary core/spool 20 formed in one-piece. The core/spool 20 is axially movable from a forward deenergized position (FIG. 1) to a retracted position (FIG. 2) upon the coil 10 becoming energized. The core/spool 20 extends from upper end 21 to a lower end 22 defining an inlet opening. When in the forward deenergized position, the upper end 21 is spaced a short distance from the conical wall surface 84 and planar surface 85 of the plug 80. The core/spool 20 extends through the retainer 50 and into the cage 40 to the lower end 22 defining an inlet opening. The core/spool 20 has an axial passageway 23 extending throughout including an enlarged area 24 extending inwardly from the lower end 22 to a tapered shoulder 25 located axially in the area of junction between the retainer 50 and cage 40. A pocket 26 is formed in the core/spool 20, extending inwardly from the upper end 21 toward the lower end 22. The pocket 26 communicates with the passageway 23 at its lower end which is defined by a radially inwardly extending annular shoulder 27.

The core/spool 20 is moveable axially in the retainer 50, cage 40 and coil 10 and is yieldingly urged toward the second end 44 of the cage 40 by a compression spring 30 positioned in the pocket 26. One end of the spring 30 abuts the radial shoulder 27 and the other end abuts the planar surface 85 of the plug 80.

Externally, the core/spool 20 is provided with an outwardly facing cylindrical wall surface 28 having a size which is slightly smaller than the size of the inwardly facing cylindrical wall surface 14 of the coil bobbin 12 and slightly smaller than the first inwardly facing cylindrical wall surface 53 of the retainer 50 so that there is a gap between such outwardly facing cylindrical wall surface 28 and the adjacent portions of the coil 10 and retainer 50. Hydraulic fluid may flow into such gap through the passageway 28 and pocket 26.

Below the outwardly facing cylindrical wall surface 28 is a reduced size cylindrical wall surface 29 defined at its upper end by an upper radial shoulder 31 and at its lower end by a lower radial shoulder 32. The size of the outwardly facing cylindrical wall surface 28 is larger than the size of the inwardly facing cylindrical surface of wall 41 of the cage 40. As a result, downward movement of the core/spool 20 toward the second end 44 of the cage 40 is limited by interference contact between the outer corner of the shoulder 31 engaging the inner corner of the cage first end 43 (see FIGS. 1 and 4). As can be seen by viewing the figures, the area of contact between the outer corner of shoulder 31 and inner corner of the first end 43 is very small. The advantage of having a small area of contact between the core/spool 20 and the cage 40 is that there will be a reduced amount of magnetic force between the core/spool 20 and the cage 40 than would be the case if there were a greater area of contact during such interference engagement.

Between the lower shoulder 32 and the lower end 22, the core/spool 20 has a substantially cylindrical exterior surface 33 sized to slidingly engage the interior surface of wall 41 of the cage 40. A plurality of annular sealing grooves 34 are formed in the cylindrical surface 33. Additionally, the core/spool 20 is provided with a reduced size wall section 35 defined by an upper radial ledge 36 and a lower radial ledge 37 which is spaced from the lower end 22. The reduced size wall 35 cooperates with the interior surface of the wall 41 of the cage 40 to define an annular passageway 38. A plurality, preferably four in number, of ports 39 are formed in the reduced size wall portion 35 to provide fluid flow communication means between the enlarged area 24 and the annular passageway 38.

The axial distance between the upper radial ledge 36 and lower radial ledge 37 is slightly greater than the axial distance between the lowermost portions of the first set of ports 45 and the uppermost portions of the second set of ports 46 of the cage 40. When the valve V is de-energized, the axial position of the core/spool 20 is as shown in FIG. 1 and the first set of ports 45 is completely closed to the flow of fluid. In such position, the second set of ports 46 is open to permit the flow of fluid to the annular passageway 38, the ports 39 and the enlarged area 24 as a result of the lower radial ledge 37 being positioned below the axially uppermost portions of such second set of ports 46. As will be appreciated, when the core/spool 40 is urged upwardly against the biasing action of the spring 30 in response to energization of the coil 10, the upper radial ledge 36 will be moved to a position such that the first set of ports 45 will become open and the lower ledge 37 will be moved axially to a position at which the second set of ports 46 will be closed. However, since the axial distance between the upper radial ledge 36 and the lower radial ledge 37 is greater than the axial distance between the lowermost portions of the first set of ports 45 and the uppermost portions of the second set of ports 46, there is a short interval during which both the first set of ports 45 and the second set of ports 46 are in communication with the annular passageway 38 with the result that fluid can flow simultaneously through both the upper set of ports 45 and the lower set of ports 46. This feature prevents a build-up of excessive pressure as the valve is energized and the core/spool 20 is moved from a position permitting the flow of fluid between only the lower end 22 and the second set of ports 46 as shown in FIG. 1 to a position permitting the flow of such fluid only between the lower end 22 and the first set of ports 45 as shown in FIG. 2.

As can be seen when the valve V is in the de-energized mode of FIG. 1, the upper radial shoulder 31 of the core/spool 20 is in contact with the first end 43 of the cage 40 and when the core/spool in such position, the lowermost portion of the annular passageway 38 defined by the lower radial ledge 37 is not axially aligned with a plane defined by the lowermost portions of the second set of ports 46 (i.e. the portions of the ports 46 closest to the second end 44) but rather is close to being aligned with a plane defined by the centers of the second set of ports 46. As a result, only about ½ of each of the second set of ports 46 is open to the flow of fluid when the core/spool 20 is in its maximum extended position shown in FIG. 1.

Similarly, as may be seen in FIG. 2, when the core/spool 20 has been retracted in response to energization of the coil 10, its upper end 21 will approach the conical surface 84 of the plug 80 causing the spring 30 to become compressed. The upper end 21 of the core/spool 20 has a conical surface disposed at an angle on the order of 44° to a plane perpendicular to the axis A. In contrast the conical surface 84 of the plug 80 is disposed at an angle on the order of 46° to a plane perpendicular to the axis A. As a result of the conical surface 84 of the plug 80 being disposed at a greater angle to such plane than the conical surface of the upper end 21 of the core/spool, the core/spool 20 will not contact the planar surface 85 of the plug nor will there be extensive surface-to-surface contact between the respective conical surfaces when the core/spool is in its maximum retracted position. Rather, when in such maximum retracted position, the conical surface of the upper end 21 at its radially outer extremity will contact the conical surface 84 with a minimal amount of surface-to-surface contact. Since both the plug 80 and the core/spool 20 have circular cross-sectional configurations in a plane perpendicular to the axis A, the area of surface-to-surface contact will define a circle having a diameter substantially equal to diameter of the outwardly facing cylindrical wall surface 28. The minimal amount of surface-to-surface contact minimizes any tendency of the core/spool 20 to stick to the plug 80 either due to magnetic forces or the presence of oil or other lubricant in that area. When in such maximum retracted position shown in FIG. 2, the upper radial ledge 36 will not be aligned with a plane defined by the uppermost portions of the first set of ports 45 (i.e. the portions of the ports 45 furthest from the second end 44) but rather is close to being aligned with a plane defined by the centers of the first set of ports 45. As a result, the first set of ports 45 will be opened only about ½ to the flow of fluid even though the core/spool 20 is in its maximum retracted position.

In assembling the valve V of the present invention, the sleeve 70 is brazed to the retainer 50 with its lower end engaged to the ledge 67 of the retainer and its exterior surface in interfacial engagement with the third inwardly facing cylindrical wall surface 66 of the retainer 50.

The windings 13 are wound around the bobbin 12 and the wound bobbin is placed in an injection mold having a cavity conforming to that of the outer housing 11. The plug 80 is press fitted to the washer 90 with the reduced size cylindrical portion 87 forced into the aperture 92. Before the wound bobbin 12 is placed in the injection mold, the joined plug 80 and washer 90 are engaged thereto with the plug 80 extending into the bobbin 12 with the O-rings 82 sealingly engaged to the inwardly facing cylindrical wall surface 14 and with the lower surface of the washer 90 engaged to the outermost portion of the radially outwardly extending wall 17. When in such position, the washer 90 functions to close the injection mold cavity and PET plastic resin may then be injection molded to encapsulate the winding 13 and bobbin 12 and to cause the washer 90 to become adhered and thereby affixed to the upper end of the outer housing 11.

The subassembly of the coil 10, plug 80 and washer 90 may then be inserted into the sleeve 70 and retainer 50 with the ears 91 of the washer resting upon the lower edges of the recesses 73. As seen in FIGS. 1 and 2, when so positioned, there will be a gap between the lower outwardly extending radial wall 15 of the bobbin 12 and the second radial shoulder 56 of the retainer 50. With the coil, plug and washer, subassembly so positioned, the portions of the sleeve 70 extending axially beyond the upper side of the washer 90 may be crimped against the upper surface of the washer to retain the washer 90, coil 10 and plug 80 in the sleeve 70 and retainer 50. The presence of the gap between the lower outwardly extending radial shoulder 15 serves to prevent crushing of the coil 10 upon crimping of the sleeve 70.

Thereafter, the core/spool 20 with the spring 30 positioned in the pocket 26 may be inserted into the second end 52 of the retainer 50 and the cage 40 thereafter screwed into engagement with the retainer 50.

Figure 5:
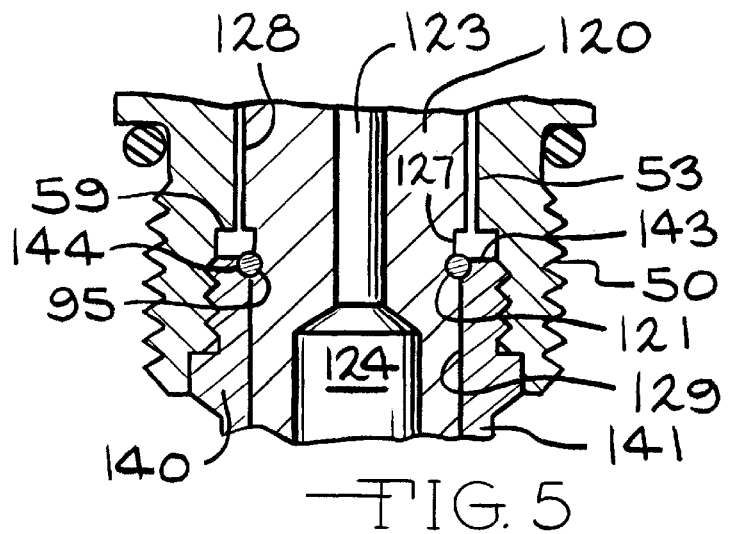
FIG. 5 is a fragmentary sectional view showing a modified embodiment.

Referring now to FIG. 5, there is shown a modified embodiment for limiting movement of the core/spool to its extended position. In the embodiment of FIG. 5, there is provided a core/spool 120 having an outwardly facing cylindrical wall surface 128 which is smaller than and maintained in spaced relationship with the first inwardly facing cylindrical wall surface 53 of the retainer 50. The core/spool 120 has an axial passageway 123 with an enlarged area 124.

A cage 140 is threadedly engaged to the retainer 50 and has a wall 141 the inner surface of which defines a passageway. The core/spool 120 has a reduced size outwardly facing cylindrical wall surface 129 sized to be in sliding interfacial contact with the interior surface of wall 141. Positioned axially between the outwardly facing cylindrical wall surface 128 and the reduced size cylindrical wall surface 129 is an annular recess 127 with an annular groove 121 positioned between the annular recess 127 and the reduced size inwardly facing cylindrical wall surface 129. A spring ring 95 having a circumferential extent on the order of 230° to 240° is positioned in the annular groove 128. The outer diameter of the spring ring 95 when positioned in the annular groove 128 is smaller than the diameter of the first inwardly facing cylindrical wall surface 53 of the retainer 50 so that the core/spool 120, when moved to its retracted position can become axially aligned with the first inwardly facing cylindrical wall surface 53 without interference.

The cage 140 is provided with a recess 144 at the inner surface of its first end 143. As can be seen by viewing FIG.

5, axial movement of the core/spool 120 toward its extended position in response to urging by the compression spring 30 when the valve V is de-energized is limited as a result of engagement of the spring ring 95 against the annular recess 144 of the cage 140.

Figure 6:
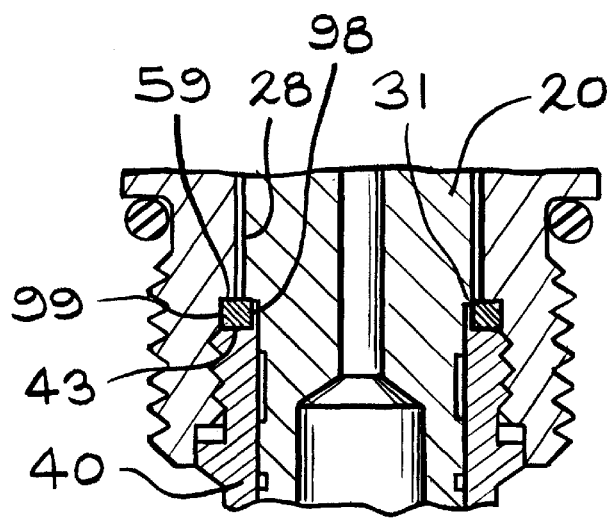
FIG. 6 is a fragmentary sectional view showing a further embodiment.

Referring to FIG. 6, there is shown a further embodiment which is similar to the embodiment of FIGS. 1 and 2 with the exception that a stop washer 99 is positioned between the first end 43 of the cage 40 and the third radial shoulder 59 of the retainer 50. The stop washer 99 has an aperture defined by an inwardly facing annular wall 98 which has a diameter smaller than the diameter of the outwardly facing cylindrical wall surface 28 of the core/spool 20. As a result, axial movement of the core/spool 20 toward the second end 44 of the cage 40 is limited by the shoulder 31 contacting the upper surface of the stop washer 99.

The stop washer 99 is manufactured from a non-magnetic material such as grade 302, 303 or 304 stainless steel and serves to minimize and magnetic attraction between the core/spool 20 and the cage 40.

In operation, when the valve V is in the de-energized potion shown in FIG. 1, hydraulic fluid will flow from the hydraulic fluid flow system and into the passageway 42, through the opening defined by the open lower end 22, into the enlarged passageway 24 of the core/spool 20, out of the ports 39, to annular passageway 38 and out of ports 46 to a holding tank. When the coil 10 is energized, the core/spool 20 will be raised to the position shown in FIG. 2 thereby closing the ports 46 from communication with the annular passageway 38 and opening the first set of ports 45 to thereby permit fluid to flow under pressure through the ports 45, into the annular passageway 38, through the ports 39 of the core/spool 20 and out of the second end 44 of the valve V and into the hydraulic fluid flow system to which the valve V is connected.

The valve of the present invention is economical in that it has few parts and may be readily assembled. When assembled, it may be easily connected in a fluid flow system without disassembling any part of the valve V itself.

Many modifications may will become readily apparent to those skilled in the art.

We claim:

1. A solenoid valve comprising:
   (a) a retainer extending along an axis from a first end to a second end and having a passageway extending axially therethrough, said passageway defined in part by a first inwardly facing cylindrical wall surface;
   (b) a coil mounted on said retainer, said coil extending along said axis from an inner end positioned within said retainer to an outer end extending axially outwardly from said retainer first end, said coil having an annular wall surface defining a passageway extending along said axis from said inner end toward said outer end;
   (c) means blocking said coil passageway in the vicinity of said coil outer end;
   (d) a cage extending along said axis and having an engagement end engaged to said retainer second end and extending outwardly from said retainer second end to a fluid receiving end, said engagement end having associated therewith a stop which includes an abutment surface extending into the passageway portion defined by said retainer first inwardly facing cylindrical surface, said cage including an annular wall defining an axially extending passageway, a first set of radial ports spaced from said fluid receiving end and a second set of radial ports positioned axially between said first set of ports and said engagement end;
   (e) a combined unitary core/spool extending along said axis from a first end positioned within said cage to a second end positioned within said coil, said core/spool being axially moveable from a deactivated, extended position to a retracted position upon actuation of said coil, said core/spool having a first outwardly facing cylindrical surface slidingly engaged with said cage wall, said first outwardly facing cylindrical surface having an annular recess extending between a first ledge and a second ledge, said first ledge being axially spaced apart from said second ledge a distance permitting said annular recess to communicate with at least one of said first set of ports or said second set of ports, said core/spool having a second outwardly facing cylindrical surface having a size larger than first outwardly facing cylindrical surface and a radial shoulder between said first outwardly facing cylindrical surface and said second outwardly facing cylindrical surface, said shoulder engageable with said stop abutment surface to limit axial movement of said core/spool toward said cage fluid receiving end and a plurality of ports extending through said wall communicating said annular recess; and
   (f) means yieldingly urging said core/spool toward said extended position.

2. The solenoid valve according to claim 1, wherein said first ledge is spaced apart from said second ledge a distance permitting said annular recess to communicate simultaneously with said first set of ports and said second set of ports.

3. The solenoid valve according to claim 2, wherein said spaced apart distance is such that, when said annular recess communicates simultaneously, both of said first set of ports and said second set of ports are only partially open.

4. The solenoid valve according to claim 1, further including a sleeve engaged to said retainer and encircling a portion of said coil and said coil includes a plastic outer housing in contact with said sleeve.

5. The solenoid valve according to claim 1, wherein said retainer has a radial shoulder adjacent said coil inner end and further including (a) a sleeve engaged to said retainer and encircling a portion of said coil, said sleeve extending axially beyond said coil outer end to a free end and having axially inwardly extending recesses at said free end, and (b) a washer affixed to said coil outer end, said washer supported on said sleeve recesses and maintaining said coil inner end in spaced relationship with said retainer radial shoulder.

6. The solenoid valve according to claim 5, further including a plug positioned in said coil passageway at said outer end, said plug having an internal end within said passageway and an external end, said internal end limiting axial movement of said core/spool toward said coil outer end.

7. The solenoid valve according to claim 6, wherein said washer has a central aperture and said plug external end is retained in said aperture.

8. The solenoid valve according to claims 6 or 7, wherein said sleeve has portions between said recesses which extend axially beyond the outer end of said coil, said axially extending portions being crimped over said washer to retain said washer, plug and coil to said retainer.

9. A solenoid coil according to claim 7, wherein said plug internal end includes a conical surface disposed at a predetermined angle relative to a plane perpendicular to said axis and said core/spool second end includes a conical surface disposed at an angle relative to a plane perpendicular to said axis which is less than said predetermined angle.

10. A solenoid valve according to claim 9, wherein, upon retraction of said core/spool upon actuation of said coil, said core/spool second end contacts a minor portion of said plug conical surface, said contacted minor portion defining substantially a circle.

11. A solenoid valve according to claim 1, wherein said means yieldingly urging said core/spool is a compression spring.

12. A solenoid valve according to claim 1, wherein said stop comprises said cage engagement end.

13. A solenoid valve according to claim 1, wherein said core/spool has an annular groove and a ring positioned in said annular groove, said ring having an external size greater than the size of said cage passageway at said engagement end, said cage engagement end forming said stop engageable by said ring.

14. A solenoid valve according to claim 1, wherein said stop comprises a washer positioned between said cage engagement end and said retainer.

15. A solenoid valve according to claim 14, wherein said stop is manufactured from a non-magnetic material.

16. The solenoid valve according to claim 1, further including a plug positioned in said coil passageway at said outer end, said plug having an internal end within said passageway and an external end, said internal end limiting axial movement of said core/spool toward said coil outer end.

17. A solenoid coil according to claim 16, wherein said plug internal end includes a conical surface disposed at a predetermined angle relative to a plane perpendicular to said axis and said core/spool second end includes a conical surface disposed at an angle relative to a plane perpendicular to said axis which is less than said predetermined angle.

18. A solenoid valve according to claim 17, wherein upon retraction of said core/spool upon actuation of said coil, said core/spool second end contacts a minor portion of said plug conical surface, said contacted minor portion defining substantially a circle.

19. The solenoid valve according to claim 1 wherein core/spool second outwardly facing cylindrical surface is spaced from said coil annular wall surface and an axial passageway permitting the flow of fluid throughout the length of said core/spool and into the space between core/spool and said coil annular wall surface.

20. In a solenoid valve comprising a coil extending along an axis from a first end to a second end, said coil having an annular wall surface defining a passageway extending along said axis from said first end toward said second end, means blocking said coil passageway in the vicinity of said coil second end, and a cage extending along said axis and having a wall with an internal surface which defines a passageway extending from an engagement end to a fluid receiving end, said internal surface having a predetermined diameter at said engagement end, the improvement comprising (a) a stop associated with said cage engagement end, said stop including an abutment surface, and (b) a combined unitary core/spool ex tending along said axis from a first end positioned within said cage to a second end positioned within said coil, said core/spool being axially moveable from a deactivated, extended position to a retracted position upon actuation of said coil, said core/spool having a first outwardly facing cylindrical surface slidingly engaged with said cage internal surface, a second cylindrical surface having a size larger than said first cylindrical surface, said second cylindrical surface being spaced from said coil annular wall surface, interference means on said core/spool between said first outwardly facing cylindrical surface and said second cylindrical surface, said interference means engageable with said stop abutment surface to limit axial movement of said core/spool toward said cage fluid receiving end, said core/spool having an axial passageway permitting the flow of fluid throughout the length of said core/spool and into the space between said core/spool and said coil annular wall surface.

21. A solenoid valve according to claim 20, wherein said interference means comprises a radial shoulder having a size larger than said first outwardly facing cylindrical wall surface.

22. A solenoid valve according to claim 21, wherein said stop abutment surface comprises said cage engagement end.

23. A solenoid valve according to claim 21, wherein said stop comprises a washer positioned between said cage engagement end and said retainer.

24. A solenoid valve according to claim 23, wherein said stop is manufactured from a non-magnetic material.

25. A solenoid valve according to claim 20, wherein said core/spool has an annular groove and said interference means comprises a ring positioned in said annular groove, said ring having an external size greater than the size of said cage internal surface at said engagement end and wherein said stop abutment surface comprises said cage engagement end.

26. The solenoid valve according to claim 20, wherein said means blocking said coil passageway comprises a plug having an internal end within said passageway and an external end, said internal end limiting axial movement of said core/spool toward said coil second end.

27. A solenoid coil according to claim 26, wherein said plug internal end includes a conical surface disposed at a predetermined angle relative to a plane perpendicular to said axis and said core/spool second end includes a conical surface disposed at an angle relative to a plane perpendicular to said axis which is less than said predetermined angle.

28. A solenoid valve according to claim 27, wherein upon retraction of said core/spool, said core/spool second end contacts a minor portion of said plug conical surface, said contacted minor portion defining substantially a circle.

* * * * *